3,642,763
PROTECTED GLUCAGON AND ITS
HYDROBROMIDE SALTS
Erich Wunsch, Tutzing, and Gerhard Wendlberger, Munich, Germany, assignors to Farbwerke Hoechst Aktiengesellschaft vormals Meister Lucius & Bruning, Frankfurt am Main, Germany
No Drawing. Filed Aug. 13, 1968, Ser. No. 752,129
Claims priority, application Germany, Aug. 19, 1967, F 53,291
Int. Cl. C07c 103/52
U.S. Cl. 260—112.5                                1 Claim

ABSTRACT OF THE DISCLOSURE

Process for the manufacture of the peptide Glucagon by means of carbodiimides in the presence of N-hydroxysuccinimide or N-hydroxyphthalimide starting from protected glucagon-peptides of the glucagon sequences 1–6 and 7–29. A protected glucagon derivative and its hydrobromide salts.

PROCESS FOR THE MANUFACTURE OF GLUCAGON

The present invention relates to a process for the synthesis of glucagon, and to a protected glucagon product.

The proteohormone glucagon could hitherto not be manufactured synthetically but was obtained from the pancreas. A complete chemical synthesis of glucagon, the antagonist of insulin, is of great interest. It is also of great practical significance since the amounts of glucagon which can be obtained from the pancreas are very small. For a therapeutic use of glucagon it would be necessary to process such quantities of pancrease as are for practical purposes not even available. Thus a chemical synthesis of glucagon is, despite the numerous steps in the synthesis, more advantageous than isolation from the pancreas and represents a considerable technical advance.

It has now been found that glucagon can be synthetically manufactured by condensing the peptide of the glucagon sequence 7 to 29, of formula H-Thr(tBu)-Ser(tBu)-Asp(OtBu)-Tyr(tBu)-Ser(tBu)-Lys(BOC)-
   7         8          9           10         11         12
Tyr(tBu)-Leu-Asp(OtBu)-Ser(tBu)-Arg-Arg-Ala-Gln-Asp(OtBu)-
  13    14    15         16      17  18  19   20    21
Phe-Val-Gln-Trp-Leu-Met-Asn-Thr(tBu)-OtBu           (I)
 22  23  24  25  26  27  28    29 with an excess of the peptide of the glucagon sequence 1–6 of formula
AdOC-His(AdOC)-Ser(tBu)-Gln-Gly-Thr(tBu)-Phe-OH
   1      2         3    4   5      6             (II)

by means of carbodiimides in the presence of N-hydroxysuccinimide or of N-hydroxyphthalimide, and subsequently splitting-off the protective groups from the protected glucagon thus obtained, of formula AdOC-His-(AdOC)-Ser(tBu)-Gln-Gly-Thr(tBu)-Phe-Thr(tBu)-
   1      2         3     4   5       6     7       
Ser(tBu)-Asp(OtBu)-Tyr(tBu)-Ser(tBu)-Lys(BOC)-Tyr(tBu)-
   8        9          10       11        12       13
Leu-Asp(OtBu)-Ser(tBu)-Arg-Arg-Ala-Gln-Asp(OtBu)-Phe-Val-
14    15          16    17  18  19  20    21       22  23
Gln-Trp-Leu-Met-Asn-Thr(tBu)(OtBu)                (III)
24   25  26  27  28    29 by means of trifluoracetic acid.

The manufacture of the glucagon peptides of sequences 1–6 as well as 7–29, which are needed as staring substances, is described in the present specification in an appendix to the examples.

In the condensation of the two fragments described, according to the process of the invention, carbodiimides are used, and dicyclohexylcarbodiimide is preferably utilized. The condensation process is carried out in the usual manner. Dimethylacetamide, phosphoric acid trisdimethylamide, or N-methylpyrrolidone, or a mixture of these solvents, is preferably used as the solvent. The reaction is started at low temperatures, say −20° C. to −10° C., and the mixture is slowly allowed to reach room temperature, while stirring, in the course of the reaction. The reaction product is obtained from the resulting reaction mixture by partially distilling off the solvent or solvents and precipitating with ether/petroleum ether. The peptide component of sequence 1–6 which is employed in excess can, surprisingly, be selectively extracted from the amorphous reaction product with tetrahydrofurane. This advantageous method of purification, which contributes significantly to the success of a technically utilizable glucagon synthesis, was not to be expected since all other solvents used in peptide chemistry fail for this special purification.

The second step of the process according to the invention, the cleavage of the protective groups, is effected by means of trifluoroacetic acid under the usual reaction conditions.

The condensation, for the purpose of synthesizing a biologically active glucagon, cannot be carried out with optionally chosen peptide fragments; it is for example not possible to build up the glucagon sequence by condensation of the peptide fragments 1–8+9–29 according to the azide method, though this condensation scheme appeared, according to prior experience in peptide chemistry, to be particularly suitable because of serine being the terminal carboxyl unit. In the condensation chosen according to the invention, using the fragments 1–6 and 7–29, condensation processes which are otherwise usual in peptide chemistry can also not be used and only the condensation method described leads to the objective.

Because of the significance of glucagon in regulating the level of blood sugar, this peptide can be used in therapy.

In the examples which follow the amino acids are abbreviated in the usual manner. The protective groups denote:

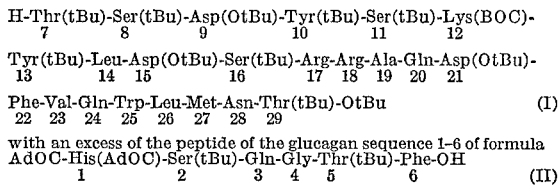

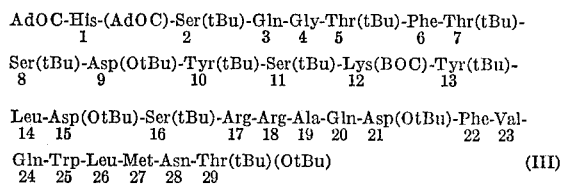

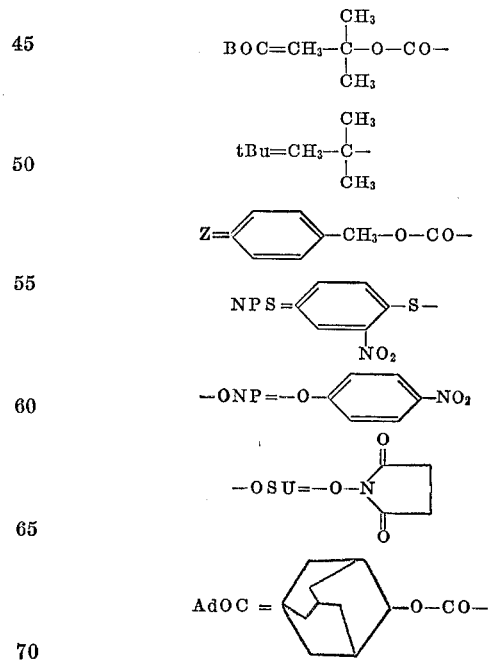

The position of the peptides in the glucagon sequence is specified in brackets behind the compounds.

EXAMPLE

(a) Protected glucagon (sequence 1–29)

Nα,N(im) - di - adamantyloxycarbonyl - L - histidyl-O - tert. - butyl - L - seryl - L - glutaminyl - glycyl - O-tert. - butyl - L - threonyl - L - phenylalanyl - O - tert.-butyl - L - threonyl - O - tert. - butyl - L - seryl - L-aspartyl(β - tert. - butyl ester) - O - tert. - butyl - L-tyrosyl - O - tert. - butyl - L - seryl - Nε - tert. - butyloxycarbonyl - L - lysyl - O - tert. - butyl - L - tyrosyl - L-leucyl - L - aspartyl - (β - tert. - butyl ester) - O - tert.-butyl - L - seryl - L - arginyl(hydrobromide) - L - arginyl(hydrobromide) - L - alanyl - L - glutaminyl - L-aspartyl(β - tert. - butyl ester) - L - phenylalanyl - L-valyl - L - glutaminyl - L - tryptophyl - L - leucyl - L-methionyl - L - asparaginyl - O - tert. - butyl - L - threonine - tert. - butyl ester (1–29)

1.9 of H - Thr(tBu) - Ser(tBu) - Asp(OtBu) - Tyr (tBu) - Ser(tBu) - Lys(BOC) - Tyr(tBu) - Leu - Asp (OtBu) - Ser(tBu) - Arg(HBr) - Arg(HBr) - Ala - Gln-Asp(OtBu) - Phe - Val - Gln - Trp - Leu - Met - Asn-Thr(tBu) - OtBu.HBr (7–29-hydrobromide) and 2.36 g. of AdOC - His(AdOC) - Ser(tBu) - Gln - Gly - Thr (tBu) - Phe - OH (2–6) and 0.343 g. of N-hydroxysuccinimide are dissolved in 40 ml. of freshly distilled dimethylacetamide/phosphoric acid tris - dimethylamide (1:1) while stirring. The resulting solution is subsequently treated with 0.07 ml. of triethylamine, cooled to −15°, and after adding 0.618 g. of dicyclohexylcarbodiimide, is stirred for 24 hours at 0° C.–5° C. and a further 3 days at room temperature. Thereafter a further 0.6 g. of AdOC - His(AdOC) - Ser(tBu) - Gln - Gly-Thr(tBu) - Phe - OH (1–6), 0.06 g. of N-hydroxysuccinimide and 0.103 g. of dicyclohexylcarbodiimide are added to the reaction mixture and the mixture is left for a further 2 days while stirring. It is warmed to 60° C. for 30 minutes, filtered, and dimethylacetamide is thereafter evaporated off at 50° C. and $10^{-2}$ mm. Hg; the residual solution is allowed to run into 1.5 l. of absolute diethyl ether. After being allowed to stand for 3 hours, the precipitate is filtered off and carefully rinsed with absolute diethyl ether. The resulting product is digested three times with hot ethyl acetate and subsequently twice more with doubly distilled water, and is briefly dried in vacuo and finally exhaustively extracted for 17 hours with absolute tetrahydrofurane in a Soxhlet apparatus. After 15 hours drying at 80° C. and $10^{-2}$ mm. Hg over $P_2O_5$: white amorphous powder. Yield: 2.06 g. (84% of theory).

$C_{232}H_{367}N_{43}O_{55}Br_2 + 6H_2O$ (4938.826). — Calculated (percent): C, 56.42; H, 7.74; N, 12.20; O, 19.76. Found (percent): C, 55.91; H, 7.39; N, 12.31; O, 19.61.

Amino acid Analysis:

|  | His | Ser | Glu | Gly | Thr | Phe | Asp | Tyr | Lys | Leu |
|---|---|---|---|---|---|---|---|---|---|---|
| Calculated: | 1 | 4 | 3 | 1 | 3 | 2 | 4 | 2 | 1 | 2 |
| Found: | 0.87 | 3.51 | 3.06 | 0.98 | 2.77 | 1.97 | 3.97 | 1.75 | 0.94 | 1.95 |

|  | Arg | Ala | Val | Trp | Met | NH3 |
|---|---|---|---|---|---|---|
| Calculated: | 2 | 1 | 1 | 1 | 1 | 4 |
| Found: | 2.0 | 1.02 | 1.04 |  | 0.94 | 4.50 |

(b) Glucagon (sequence 1–29)

L - histidyl - L - seryl - L - glutaminyl - glycyl - L-threonyl - L - phenylalanyl - L - threonyl - L - seryl - L-aspartyl - L - tryosyl - L - seryl - L - lysyl - L - tyrosyl-L - leucyl - L - aspartyl - L - seryl - L - arginyl - L-arginyl - L - alanyl - L - glutaminyl - L - aspartyl - L-phenylalanyl - L - valyl - L - glutaminyl - L - tryptophyl-L - leucyl - L - methionyl - L - asparaginyl - L - theonine (1–29)

10 ml. of anhydrous trifluoracetic acid are poured over 0.5 g. of AdOC - His(AdOC) - Ser(tBu) - Gln - Gly-Thr(tBu) - Phe - Thr(tBu) - Ser(tBu) - Asp(OtBu)-Tyr(tBu) - Ser(tBu) - Lys(BOC) - Tyr(tBu) - Leu-Asp(OtBu) - Ser(tBu) - Arg(HBr) - Arg(HBr) - Ala-Gln - Asp(OtBu) - Phe - Val - Gln - Trp - Leu - Met - Asn - Thr(tBu) - OtBu (1–29) and the material allowed to stand for 2 hours at room temperature under an argon atmosphere; solution thereupon occurs. Thereafter the trifluoroacetic acid is stripped off at as low a temperature as possible (bath temperature maximally 15° C.) in vacuo ($10^{-2}$ mm. Hg) and the remaining residue is stirred for 1 hour with an aqueous suspension of Dowex 4 (OH form) and stirred for a further 10 minutes after acidification to about pH=4 with acetic acid. The filtrate from the ion exchanger is lyophilized. The resulting material is taken up in ice-cold water, freed of a little insoluble matter by filtration, and again lyophilized: white amorphous powder. Yield: 380 mg. (crude glucagon).

$C_{153}H_{225}N_{43}O_{49}S + XH_2O$

Amino acid Analysis:

|  | His | Ser | Glu | Gly | Thr | Phe | Asp | Tyr | Lys | Leu |
|---|---|---|---|---|---|---|---|---|---|---|
| Calculated: | 1 | 4 | 3 | 1 | 3 | 2 | 4 | 2 | 1 | 2 |
| Found: | 0.85 | 3.48 | 2.94 | 0.99 | 2.68 | 1.96 | 3.90 | 1.75 | 0.91 | 1.92 |

|  | Arg | Ala | Val | Trp | Met | NH3 |
|---|---|---|---|---|---|---|
| Calculated: | 2 | 1 | 1 | 1 | 1 | 4 |
| Found: | 1.99 | 1.02 | 1.01 |  | 0.90 | 5.02 |

MANUFACTURE OF THE STARTING PEPTIDES

A sequence 1–6

(1) Benzyloxycarbonyl-O-tert.-butyl-L-threonyl-L-phenylalaninemethyl ester (5–6)

31.4 ml. of triethylamine, 29 g. (227 mmols) of H-Phe-OMe.HCl (6-hydrochloride) and 51 g. (248 mmols) of dicyclohexylcarbodiimide are added successively at −5° C. to a solution of 70 g. (226 mmols) of Z-Thr(tBu)-OH (5) in 500 ml. of dichloromethane. Thte reaction mixture is stirred for 4 hours at −5° C. and a further 10 hours at room temperature. The filtrate obtained on removing dicyclohexylurea is evaporated in vacuo, the residue is partitioned between ethyl acetate and water, and the separated organic phase is washed with dilute citric acid, potassium bicarbonate solution and water in the usual manner and is dried over sodium sulfate. After evaporation in vacuo an oil is obtained which is dried for several hours in a high vacuum. Yield 80.0 g. (75% of theory).

(2) O-tert.-butyl-L-threonyl-L-phenylalanylmethyl ester hydrochloride (5–6)

80.0 g. (170 mmols) of oily Z-Thr(tBu)-Phe-OMe (5–6) in 400 ml. of methanol are hydrogenated in the usual manner at pH=4, with dropwise addition of a N solution of hydrochloric acid in methanol. The filtrate resulting on removal of the catalyst is concentrated in vacuo and the residue is recrystallized from methanol/diethyl ether: melting point 162–163°; $(\alpha)_D^{20}$: +26.6±1° and $(\alpha)_{546}^{20}$: +33.1° (c.=1.3 in ethanol). Chromatographically pure in tert.-butanol/glacial acetic acid/water/pyridine (30:6:24:20) and tert.-butanol/glacial acetic acid/water (6:2:2). Yield 59.1 g. (93% of theory).

$C_{18}H_{28}N_2O_4$.HCl (372.9).—Calculated (percent): C, 57.98; H, 7.84; N, 7.51. Found (percent): C, 57.79; H, 7.85; N, 7.31.

(3) Benzyloxycarbonyl-L-glutaminyl-glycine-methyl ester (3–4)

28.6 ml. of chloroformic acid ethyl ester are slowly added dropwise at −15° C., with stirring, to 84.0 g. (0.3 mol) of Z-Gln-OH (3) and 41.7 ml. of triethylamine in 400 ml. of tetrahydrofurane/acetonitrile (1:1). 37.8 g. (approx. 0.3 mol) of H-Gly-OMe.HCl (4-hydrochloride) and 41.7 ml. of triethylamine in 200 ml. of dimethylformamide are added to the reaction mixture which is stirred for an hour at −10° C. and a further 4 hours at room temperature. Thereafter the solvents are distilled off in vacuo. The residue is treated with 1000 ml. of 0.5 N HCl and the resulting solid material is filtered off, thereafter digested with 0.5 N potassium bicarbamate solution, again filtered and thoroughly washed with water. The product is dried in vacuo over $P_2O_5$ and finally recrystallized from methanol: melting points 174.5–175.5°; $(\alpha)_D^{20}$: −16.2 ±1° and $(\alpha)_{546}^{20}$: −18.8° (c.=0.8 in ethanol) 1 $(\alpha)_D^{20}$: −6.6±1° and $(\alpha)_{54}^{20}$: −7.7° (c.=1; in glacial acetic acid). Yield 80.3 g. (76% of theory).

$C_{16}H_{21}N_3O_6$ (351.4).—Calculated (percent): C, 54.76; H, 6.02; N, 11.96. Found (percent): C, 54.48; H, 6.11; N, 11.71.

(4) L-Glutaminyl-glycinemethyl ester hydrochloride (3–4 hydrochloride)

A suspension of 88.0 g. (235 mmols) of Z-Gln-Gly-OMe (3–4) in 400 ml. of methanol is hydrogenated for 12 hours in the usual manner at pH=4, in the presence of palladium black and with dropwise addition of a N solution of hydrochloric acid in methanol. The filtrate resulting from the removal of catalyst is evaporated in vacuo and the residue is recrystallized from absolute ethanol: melting point 110–113°; $(\alpha)_D^{20}$: +16.6±1° and $(\alpha)_{546}^{20}$: +19.3° (c.=2.3 in methanol). Yield 56.3 g. (94.5% of theory).

$C_8H_{15}N_3O_4 \cdot HCl$ (253.7).—Calculated (percent): C, 37.87; H, 6.36; N, 16.56; Cl, 13.98. Found (percent): C, 37.66; H, 6.32; N, 16.38; Cl. 13.97.

(5) Benzyloxycarbonyl-O-tert.-butyl-L-seryl-L-glutaminyl-glycinemethyl ester (2–4)

20.2 ml. of chloroformic acid ethyl ester are added dropwise at −10° C., while stirring, to 62.5 g. (212 mmols) of Z-Ser(tBu)-OH (2) manufactured according to Chem. Ber. 99, 105 (1966) and 29.4 ml. of triethylamine in 400 ml. of tetrahydrofurane. 53.6 g. (212 mmols) of H-Gln-Gly-OMe.HCl (3,4-hydrochloride) and 29.4 ml. of triethylamine in 300 ml. of dimethylformamide are added to the resulting solution of the asymmetrical anhydride. The reaction solution is stirred for 1 hour at −10° C. and then for 2 hours at room temperature, and is subsequently evaporated in vacuo. The resulting residue is treated with dilute citric acid solution and the solid product formed is filtered, washed with water until free of acid, dried in vacuo over $P_2O_5$ and finally recrystallized from ethanol: melting point 185–186°; $(\alpha)_D^{20}$: −9.2 ±0.5° and $(\alpha)_{546}^{20}$: −10.7° (c.=1.6 in ethanol); $(\alpha)_D^{20}$: −15.6±1° and $(\alpha)_{546}^{20}$: −18.9° (c.=1; in 80% acetic acid), after drying at 90° and $10^{-3}$ mm. Hg. Chromatographically pure in n-amyl alcohol/pyridine/water (35: 35:30). Yield 83.6 g. (80% of theory).

$C_{23}H_{34}N_4O_8$ (494.6).—Calculated (percent): C, 55.86; H, 6.93; N, 11.33. Found (percent): C, 55.68; H, 7.01; N, 11.35.

(6) Benzyloxycarbonyl-O-tert. butyl-L-seryl-L-glutaminyl glycine (2–4)

32.7 g. (66 mmols) of Z-Ser(tBu)-Gln-Gly-OMe (2–4) in 150 ml. of dioxane are saponified with 66 ml. of N sodium hydroxide solution in the usual manner. After acidification with 66 ml. of N sulfuric acid, the solution is evaporated to dryness in vacuo and the residue is treated with acetone, whereupon sodium sulfate remains undissolved. The filtrate on evaporation in vacuo leaves a solid residue which is recrystallized from a little water: melting point 158–159° (145°); $(\alpha)_D^{20}$: −9.0±1° and $(\alpha)_{546}^{20}$: −10.3° (c.=1.2; in ethanol). Chromatographically pure in tert.-butanol/glacial acetic acid/water/pyridine (30:6:24:20). Yield 29.2 g. (90% of theory).

$C_{22}H_{32}N_4O_8 \cdot 1/2 H_2O$ (489.5).—Calculated (percent): C, 53.98; H, 6.80; N, 11.43. Found (percent): C, 54.06; H, 6.89; N, 11.39.

(7) Benzyloxycarbonyl-O-tert.-butyl-L-seryl-L-glutaminyl-glycyl - O - tert.-butyl-L-threonyl - L - phenylalanine-methyl ester (2–6)

32.9 g. (88 mmols) of H-Thr(tBu)-Phe-OMe.HCl (5-6-imide and 20.0 g. (97 mmols) of dicyclohexylcarbodiimide are added to 42.2 g. (88 mmols) of Z-Ser(tBu)-Gln-Gly-OH (2–4)

in 12.25 ml. of triethylamine in 300 ml. of dimethylformamide at −5° C. The reaction mixture is stirred for 4 hours at −5° C. and 14 hours at room temperature, precipitated dicyclohexylurea is filtered off and the filtrate evaporated in vacuo. The resulting residue is successively digested with 5% citric acid solution and 10% potassium bicarbonate solution, filtered off and carefully washed with water. After recrystallization from 70% methanol: melting point 178.5–181.5°; $(\alpha)_D^{20}$: +5.4±1° and $(\alpha)_{546}^{20}$: +6.5° (c.=1.1; in methanol). Chromatographically pure in n-heptane/n-butanol/glacial acetic acid (3:1:1) and n-propanol/ethyl acetate/water (7:1:2). Yield 65 g. (93% of theory).

$C_{40}H_{38}N_6O_{11}$ (798.9).—Calculated (percent): C, 60.13; H, 7.32; N, 10.52; O, 22.03. Found (percent): C, 60.07; H, 7.28; N, 10.60; O, 21.98.

(8) Benzyloxycarbonyl-O-tert.-butyl-L-seryl-L-glutaminyl-glycyl-O-tert.-butyl-L-threonyl-L-phenylalanine (2–6)

A solution of 20.0 g (25 mmols) of

Z-Ser(tBu)-Gln-Gly-Thr(tBu)-Phe-OMe (2–6)

in 40 ml. of dioxane is hydrolyzed with 25.5 ml. of N sodium hydroxide solution over the course of 30 minutes in the usual manner. After acidification with 25.5 ml. of N hydrochloric acid, the dioxane is largely removed in vacuo; on standing at +2°, crystallization takes place. The precipitated product is filtered off, dried in vacuo over $P_2O_5$ and finally recrystallized from ethanol/ethyl acetate or acetonitrile. Melting point 155.5–157°;

$(\alpha)_D^{20}: +16.7 \pm 1°$ and $(\alpha)_{546}^{20}$: +19.1° (c.=1; in methanol). Yield 16.3 g. (83% of theory).

$C_{39}H_{56}N_6O_{11}$ (784.9).—Calculated (percent): C, 59.68; H, 7.19; N, 10.71; O, 22.42. Found (percent): C, 59.67; H, 7.33; N, 10.62; O, 22.47.

(9) O-tert.-Butyl - L - seryl-L-glutaminyl-glycyl-O-tert.-butyl-L-threonyl-L-phenylalanine (2–6)

15.7 g. (20 mmols) of

Z-Ser(tBu)-Gln-Gly-Thr(tBu)-Phe-OH (2–6)

in 300 ml. of aqueous methanol and 1 ml. of acetic acid are hydrogenolytically deacylated in the usual manner. The filtrate obtained on removing the catalyst leaves a residue on evaporation in vacuo which crystallizes from methanol/propanol-2/diethyl ether: $(\alpha)_D^{20}$: +7.33±1° and $(\alpha)_{546}^{20}$: +9.13° (c.=0.9; in water). Chromatographically pure in tert.-butanol/glacial acetic acid/water (4:1:5) or amyl alcohol/pyridine/water (35:35:30). Yield 10.85 g. (80% of theory).

$C_{31}H_{50}N_6O_9 + 1.5\ H_2O$ (677.8).—Calculated (percent): C, 54.96; H, 7.86; N, 12.41; O, 24.71. Found (percent): C, 54.94; H, 8.07; N, 12.48; O, 25.03.

(10) Nα,N(im) - Di - adamantyloxycarbonyl-L-histidine N-hydroxysuccinimide ester (1)

11 g. of dicyclohexylcarbodiimide are added at 0° C. to 25.6 g. of AdOC—His(AdOC)—OH (1–3) manufactured according to J. Amer. Chem. Soc. 88 (1966), page 1988 and 7 g. of N-hydroxysuccinimide in 250 ml. of dioxane. The reaction mixture is stirred for 2 hours at 0° C. and 12 hours at room temperature after renewed cooling to 0° C. the dicyclohexylurea which has separated out is filtered off. The residue obtained on evaporating the filtrate in vacuo is treated with 100 ml. of dichloromethane whereupon small quantities of dicyclohexylurea remain undissolved. A little petroleum ether is carefully added to the warmed dichloromethane solution. After commencement of crystallization, the material is covered with a layer of petroleum ether and is allowed to stand initially at room temperature and subsequently at −5° C. to complete the crystallization. The product is filtered off and dried in vacuo at 60° C.: melting point 164.5–167.5° C. (151° C.). Yield 22.6 g.

(The resulting AdOC—His(AdOC)—OSU still contains a little N-hydroxysuccinimide but is sufficiently pure for further reaction.)

(11) N·N(im) - di - adamantyloxycarbonyl - L - histidyl-O-tert.-butyl - L - seryl-L-glutaminyl-glycyl - O - tert.-butyl-L-threonyl-L-phenylalanine (1–6)

9.2 g. (approx. 1.5 mmols) of

AdOC—His(AdOC)—OSU (1)

(crude product) are added at $-5°$ C. to 6.78 g. (1 mmol) of H-Ser(tBu)-Gln-Gly-Thr(tBu)-Phe-OH (2–6) and 1.4 ml. of triethylamine in 150 ml. of pyridine. The reaction solution is stirred for 2 hours at $0°$ C. and a further 8 hours at room temperature, evaporated in vacuo, and the residue is treated with absolute diethyl ether and filtered off. The solution of the resulting product in 100 ml. of methanol is allowed to run into 500 ml. of water containing 4.3 g. of citric acid. The resulting precipitate is filtered off and after careful washing with water is dried in vacuo and subsequently taken up in 300 ml. of ethyl acetate/methanol (5:1). 100 ml. of absolute diethyl ether are slowly allowed to run into this solution, while stirring. After standing for several hours in a refrigerator at $-5°$ C. the precipitate is filtered off and dried in vacuo at $40°$ C. On recrystallizing from acetonitrile and drying the precipitate at $60°$ C. and $10^{-3}$ mm. Hg, the acyl-hexapeptide containing 1 mol of water and ½ mol of acetonitrile is obtained.

$C_{59}H_{85}N_9O_{14}+H_2O+\frac{1}{2}CH_3CN$ (1182.9).—Calculated (percent): C, 60.92; H, 7.54; N, 11.25; O, 20.29. Found (percent): C, 60.88; H, 7.61; N, 11.24; O, 20.09;

$(\alpha)_D^{20}: +16.63 \pm 1°$ and $(\alpha)_{546}^{20}: +1994°$ (c.=0.9; in methanol). Chromatographically pure in amyl alcohol/pyridine/water (35:35:30), n-butanol/glacial acetic acid/water (6:2:2) and n-heptane/n-butanol/glacial acetic acid (1:2:1). Yield 9.45 g. (80% of theory).

$C_{59}H_{85}N_9O_{14}+CH_3OH$ (1176.4).—Calculated (percent): C, 61.26; H, 7.63; N, 10.72; O, 20.40. Found (percent): C, 60.90; H, 7.87; N, 10.87; O, 20.33.

Amino acid analysis:

|  | His | Ser | Glu | Gly | Thr | Phe | NH₃ |
|---|---|---|---|---|---|---|---|
| Calculated: | 1 | 1 | 1 | 1 | 1 | 1 | 1 |
| Found: | 0.96 | 0.96 | 1.0 | 1.0 | 1.0 | 0.96 | 1.21 |

(B) Sequence (7–29)

(1) Nα-2-nitrophenylsulphenyl-O-tert.-butyl-L-serine-4-nitrophenyl ester [NPS-Ser(tBu)-ONP] (8)

55 mmols of 2-nitro-phenylsulfenyl chloride in 25 ml. of dioxane as well as 2 N sodium hydroxide solution are added dropwise with stirring over the course of 30 minutes to 50 mmols of H-Ser(tBu)-OH in 25 ml. of dioxane and 17 ml. of 2 N sodium hydroxide solution, while maintaining a pH value of 8. (Consumption, approx. 38 ml. of 2 N sodium hydroxide solution). The reaction mixture is stirred for a further 1 hour, filtered after dilution with 600 ml. of water, and after addition of 200 ml. of ethyl acetate is carefully acidified to pH=3 with N sulfuric acid at $0°$ C. The separated organic phase is twice washed with a little water. 50 mmols of 4-nitrophenol with 50 mmols of dicyclohexylcarbodiimide are added at $0°$ C., with mmols of dicyclohexylcarbodiimide are added at $0°$ C., with stirring, to the resulting ethyl acetate solution of the NPS-O-tert.-butyl-serine after drying the latter over sodium sulfate. The reaction mixture is stirred for a further 1 hour at $0°$ C. and 3 hours at room temperature, precipitated dicyclohexylurea is filtered off after brief cooling to $0°$ C., and the filtrate evaporated in vacuo. The remaining residue is recrystallized from ethanol and dried in vacuo over P₂O₅. Yield 67.5% of theory. Melting point 82.5–83.5°; $(\alpha)_D^{20}: -116.0$ and $(\alpha)_{546}^{20}=-130.8°$ (c.=1 in dimethylformamide).

$C_{19}H_{21}N_3O_7S$ (435.3).—Calculated (percent): C, 52.43; H, 4.86; N, 9.65; S, 7.35. Found (percent): C, 52.16; H, 4.86; N, 9.25; S, 7.17.

(2) L - aspartyl(β - tert. - butyl ester) - O - tert.-butyl-L - tyrosyl-O-tert.-butyl - L - seryl - Nε - tert. - butyloxycarbonyl - L - lysyl - O - tert. - butyl - L - tyrosyl-L-leucyl-aspartic acid(β-tert.-butyl ester)(9–15)

200 g. (141 mmols) of Z-Asp(OtBu)-Tyr-(tBu)-Ser (tBu)-Lys(BOC)Tyr(tBu)-Leu-Asp(OtBu) - OH (9–15) manufactured according to Chem. Ber. 99 (1966), p. 105, in 2000 ml. of dimethylformamide/95% methanol (1:1) and 3 ml. of glacial acetic acid are hydrogenated at $40°$ C. for 72 hours in the usual manner. The reaction mixture is warmed on a water bath, freed of catalyst by filtration and allowed to crystallize in the cold. The resulting product is digested with ethanol and dried in vacuo. Chromatographically pure in n-amyl alcohol/pyridine/water (35.35:30) and in n-butanol/glacial acetic acid/water (6:2:2). Melting point above $250°$ C.;

$(\alpha)_D^{20}: +3.5 \pm 1°$ and $(\alpha)_{546}^{20}: +4.6$ (c.=1.4; in 80% acetic acid). Yield 176.4 g. (99%).

$C_{66}H_{106}N_8O_{17}\cdot 1H_2O(1301.7)$.—Calculated (percent): C, 60.90; H, 8.36; N, 8.61. Found (percent): C, 60.82; H, 8.42; N, 8.61.

After drying at $90°$ C. and $10^{-3}$ mm. Hg the anhydrous substance is obtained.

$C_{66}H_{106}N_8O_{17}$ (1283.6).—Calculated (percent): C, 61.76; H, 8.32; N, 8.73. Found (percent): C, 61.78; H, 8.40; N, 8.73.

(3) Nα - benzyloxycarbonyl - O - tert. - butyl - L - seryl-L-aspartyl(β - tert.butyl ester) - O - tert.-butyl - L-tyrosyl - O-tert.-butyl-L-seryl-Nε-tert.-butyloxycarbonyl-L-lysyl-O-tert.-butyl-L-tyrosyl - L - leucyl - L - aspartic acid(β-tert.-butyl ester)(8–15)

8.21 g. (6.32 mmols) of H-Asp(Otbu)-Tyr(tBu) - Ser (tBu)-Lys(BOC)-Tyr(tBu)-Leu - Asp(OtBu)-OH (9–15) are dissolved in 100 ml. of dimethylformamide together with 0.89 ml. of triethylamine. 3.42 g. (8.2 mmols) of Z-Ser(tBu)-ONP (8 g.) manufactured according to Chem. Ber. 99 (1966), p. 105, are added at room temperature, while stirring. After stirring for 48 hours the reaction mixture is treated with 3.8 ml. of glacial acetic acid and is subsequently concentrated in vacuo. The resulting residue is treated with dilute citric acid solution, filtered off and carefully washed, first with water and then with diethyl ether. After recrystallization from 90% methanol and drying at $80°$ C. and $10^{-3}$ mm. Hg; melting point 208–209°; $(\alpha)_D^{20}: -12.8 \pm 1°$ and $(\alpha)_{546}^{20}: -17.5$ (c.=1; in methanol). Chromatographically pure in amyl alcohol/pyridine/water (35:35:30) and in n-butanol/water/glacial acetic acid (6:2:2). Yield: 8.75 g. (88%).

$C_{81}H_{125}N_9O_{21}\cdot\frac{1}{4}H_2O(1565.5)$.—Calculated (percent): C, 62.15; H, 8.08; N, 8.05. Found (percent): C, 62.06; H, 8.11; N, 8.01.

(4) O - tert.-butyl-I-seryl-L-aspartyl (β-tert.-butyl ester)-O - tert.butyl - L - tyrsyl-O-tert.butyl-L-seryl-Nε-tert.-butyloxycarbonyl - L - lysyl-O-tert.butyl-L-tyrosyl-L-leucyl-L-aspartic acid(β-tert.-butyl ester) (8–15)

50 g. (32 mmols) of Z-Ser(tBu)-Asp(OtBu)-Tyr(tBu)-Ser(tBu) - Lys(BOC)-Tyr(tBu)-Leu-AspOtBu)-OH (8–15) in 800 ml. of dimethylformamide/95% methanol (1:1) and 3 ml. of acetic acid are hydrogenated at $45°$ C. in the usual manner. The precipitated product is dissolved by brief heating on a water bath, the catalyst is filtered off while still hot, and the filtrate is subsequently allowed to stand for several hours in a refrigerator at $-5°$ C. The material which has separated out is filtered off, washed with water and dried over P₂O₅ in vacuo. Melting point 250°; C. $(\alpha)_D^{20}: -3.9 \pm 10$ and $(\alpha)_{546}^{20}: -4.5°$ (c.=1; in 80% strength acetic acid). Chromatographically pure in n-butanol/glacial acetic acid/water (2:2:1) and in amyl alcohol/pyridine/water (35:35:30). Yield 40.9 g. (80%).

$C_{73}H_{119}N_9O_{19} \cdot 1H_2O$ (1444.8).—Calculated (percent): C. 60.69; H, 8.44; N, 8.73; O, 22.10. Found (percent): C. 60.79; H, 8.58; N, 8.73; O, 21.91.

(5) Nα-2-nitro-phenylsulfenyl-O-tert.-butyl-L-threonine (NPS-Thr(tBu)-OH) (7)

7 g. (40 mmols) of H-Thr(tBu)-OH are reacted with 2-nitro-phenylsulfenyl chloride as described under (B) (1) and worked-up. The resulting ethyl acetate solution is distilled in vacuo, finally with azeotropic distillation with benzene, whereupon crystallization occurs. The product is treated with petroleum ether and filtered off, thoroughly washed with the same solvent and dried in vacuo. After recrystallization from diethyl ether/petroleum ether: melting point=112–114°; C. $(\alpha)_D^{20}$= —93.2±10 and $(\alpha)_{546}^{20}$=—95.9° (c.=1; in dimethylformamide). Yield; 12.85 g. (almost quantitative).

$C_{14}H_{20}N_2O_5S$ (328.4).—Calculated (percent): C. 51.21; H, 6.13; N, 8.53; S, 9.74. Found (percent): C, 51.26; H, 6.07; N, 8.46; S, 9.74.

(6) Nα-2-nitrophenylsulfenyl-O-tert.-butyl-L-threonine-N-hydroxysuccinimide ester (NPS-Thr(tBu)-OSU) (7)

25 mmols of N-hydroxysuccinimide and 25 mmols of dicyclohexylcarbodiimide are added to 25 mmols of NSP-Thr(tBu)-OH in 150 ml. of ethyl acetate at 0° C., while stirring. The reaction mixture is stirred for a further 1 hour at 0° C. and 3 hours at room temperature. After filtering off the precipitated dicyclohexylurea the solution is evaporated in vacuo and the resulting residue is treated with ethanol. Hereupon solution first occurs, followed by rapid crystallization which is completed by standing in a refrigerator for several hours. Yield 91% of theory. Melting point 138–139.5°; C. $(\alpha)_D^{20}$=—52.9° and $(\alpha)_{546}^{20}$= —56.9° (c.=1 in dimethylformamide).

$C_{18}H_{23}N_3O_7S$ (425.4).—Calculated (percent): C, 50.82; H, 5.45; N, 9.87; S, 7.52. Found (percent): C, 50.81; H, 5.46; N, 9.70; S, 7.58.

(7) Nα-2-nitrophenylsulfenyl-O-tert.-butyl-L-threonyl-O-tert.-butyl-L-seryl-L-asparagyl(β-tert.-butyl ester)-O-tert.-butyl-L-tyrosyl-O-tert.-butyl-L-seryl-N-tert.-butyloxycarbonyl-L-lysyl-O-tert.-butyl-L-tyrosyl-L-leucyl-L-aspartic acid (β-tert.-butyl ester) (7–15)

1.12 ml. of triethylaminea nd 4.2 g. (8.8 mmols) of NPS-Thr(tBu)-OSU (7) manufactured according to example (B)(6) are added to 11.6 g. (8 mmols) of H-Ser(tBu)-Asp(OtBu)-Tyr(tBu)-Ser(tBu)-Lys(BOC)-Tyr(tBu)-Leu-Asp(OtBu)-OH (8–15) in 150 ml. of dimethylformamide and the reaction mixture is stirred for 15 hours at room temperature until it solidifies to a jelly-like material. On treating the mass with 1000 ml. of dilute critric acid solution (pH=4) the product flocculates; after careful trituration it is filtered off and thoroughly rinsed with water. The product is dissolved in a little hot methanol while still moist; On standing overnight at 0° C. pure crystalline nonapeptide derivative separates out. This is filtered off and dried in vacuo at $10^{-3}$ mm. Hg; $(\alpha)_D^{20}$:—20.8±1° and $(\alpha)_{546}^{20}$:—23.0° (c.=0.9; in dimethylformamide). Chromatographically pure in amyl alcohol/pyridine/water (35:35:30), chloroform/methanol (7:3) and n-butanol/glacial acetic acid/water (6:2:2) and n-butanol/ethanol/water (2:2:1). Yield 12.4 g. (89%).

$C_{87}H_{137}N_{11}O_{23}S$ (1737.2).—Calculated (percent): C, 60.15; H, 7.95; N, 8.87; S, 1.81; O, 21.19. Found (percent): C, 59.94; H, 8.05; N, 8.58; S, 1.94; O 21.43.

Amino acid analysis:

|  | Thr | Ser | Asp | Tyr | Lys | Leu |
|---|---|---|---|---|---|---|
| Calculated: | 1 | 2 | 2 | 2 | 1 | 1 |
| Found: | 0.95 | 1.81 | 2.06 | 1.85 | 1.02 | 1.03 |

(8) Nα-2-nitrophenylsulfenyl-O-tert.-butyl-L-seryl-L-arginyl(hydrobromide) - L - arginyl(hydrobromide)-L-alanyl-L-glutaminyl-L-aspartic acid(β-tert.-butyl ester) (16–21)

10 g. of NPS-Ser(tBu)-ONP are added at —10° C. to 15.8 g. of H-Arg(HBr)-Arg-(AcOH)-Ala-Gln-Asp-(OtBu)-OH (17–21), manufactured according to Chem. Ber. 100 (1967), p. 820, in 200 ml. of dimethylformamide. The reaction solution is stirred for 24 hours at 0° C. and 40 hours at room temperature and subsequently stirred into a large amount of diethyl ether. The precipitated material is filtered off, dissolved in a little dimethylformamide and again stirred into diethyl ether; the procedure is again repeated and the material which has separated out is filtered off and carefully washed with ethyl acetate and diethyl ether. After two recrystallizations from methanol/ethanol: decomposition point from 170° C. upwards; $(\alpha)_{578}^{20}$: —31.1±1° (c.=1; in dimethylformamide). Chromatographically pure in n-butanol/acetic acid/water (6:2:2). Yield 18.4 g. (93% of theory).

$C_{41}H_{69}N_{14}O_{13}+H_2O$ (1096.1).—Calculated (percent): C, 44.93; H, 6.53; N, 17.90; O, 20.44; Br, 7.29; S, 2.93. Found (percent): C, 44.97; H, 6.78; N, 17.54; O, 20.39; Br, 7.05; S, 2.88.

(9) N-2-nitrophenylsulfenyl-O-tert.-butyl-L-seryl-L-arginyl(hydrobromide) - L - arginyl(hydrobromide)-L-alanyl-L-glutaminyl-L-aspartyl(β-tert.-butyl ester)-L-phenyl-alanyl-L-valyl-L-glutaminyl-L-tryptophyl-L-leucyl-L-methionyl-L-asparaginyl-O-tert.-butyl-L-threonine-tert.-butyl ester (16–29)

3.42 g. of dicyclohexylcarbodiimide are added at —15° C. to 16.5 g. of NPS-Ser(tBu)-Arg(HBr)-Arg-Ala-Gln-Asp(OtBu)-OH (16–21), 18.5 g. of H-Phe-Val-Gln-Trp-Leu-Met-Asn-Thr-OtBu. HBr (22–29-hydrobromide)— manufactured from the free octapeptide (22–29) Chem. Ber. 100 (1967) p. 816, in dimethylformamide by reaction with the calculated quantity of 0.1 N hydrobromic acid— and 1.73 g. of N-hydroxysuccinimide in 300 ml. of dimethylformamide. The reaction solution is stirred for 60 hours at 0° C. and 24 hours at room temperature. The filtrate obtained on removing the dicyclohexylurea which has separated out is stirred into 2000 ml. of ethyl acetate. The resulting precipitate is filtered off and subsequently twice reprecipitated from a little methanol/water. (The resulting precipitate is appropriately separated off by centrifuging). The product thus obtained is finally further purified by three reprecipitations from dimethylformamide/ethyl acetate/water (200:2500:20 ml.): melting point 230–232° C. (decomposition); $(\alpha)_D^{20}$:—18.83±1° and $(\alpha)_{546}^{20}$:—20.80° (c.=1; in dimethylformamide). Chromatographically pure in amyl alcohol/pyridine/water (35:35:30) and tert.-butanol/acetic acid/water/pyridine (60:6:24:20). Yield 24.4 g. (70% of theory).

$C_{98}H_{155}N_{25}O_{24}Br_2S_2+H_2O$ (2309.49). — Calculated (percent): C, 50.57; H, 6.85; N, 15.16; O, 17.32; Br, 6.92; S, 2.78. Found (percent): C, 50.94; H, 6.94; N, 14.96; O, 17.69; Br, 6.36; S, 2.79.

Amino acid analysis:

|  | Ser | Arg | Ala | Glu | Asp | Phe | Val | Leu | Met | Thr |
|---|---|---|---|---|---|---|---|---|---|---|
| Calculated: | 1 | 2 | 1 | 2 | 2 | 1 | 1 | 1 | 1 | 1 NH$_3$ |
| Found: | 0.84 | 1.98 | 0.97 | 2.0 | 2.01 | 1.02 | 1.03 | 1.04 | 1.01 | 0.96 NH$_3$ 3.26 |

(10) O-tert.-butyl-L-seryl-L-arginyl(hydrobromide)-L-arginyl(hydrobromide)-L-alanyl-L-glutaminyl-L-aspartyl(β-tert.-butyl ester)-L-phenylalanyl-L-valyl-L-glutaminyl-L-tryptophyl-L-leucyl-L-methionyl-L-asparaginyl-O-tert.-butyl-L-threonine-tert.-butyl ester hydrobromide (16–29)

110 ml. of 0.1 N hydrobromic acid solution in methanol is added dropwise to 11.5 g. of NPS-Ser(tBu)-Arg(HBr)-Arg(HBr)-Ala-Gln-Asp(OtBu)-PheVal-Gln-Tro-Leu- Met-Asn-Thr(tBu)-OtBu (16–29) and 13.1 g. of 2-methylindole in 850 ml. of dimethylformamide/methanol (16:1) while cooling with ice. The reaction mixture is stirred for a further 2 hours under continued ice cooling and subsequently for 5 hours at room temperature and is subsequently poured into a large amount of absolute diethyl ether. The resulting precipitate is filtered off and is twice reprecipitated from dimethylformamide/methanol/diethyl ether with addition of 2-methylindole. The product, which is now colorless, is filtered off, washed with absolute diethyl ether and is finally dried in vacuo at $10^{-3}$ mm. Hg: melting point 216–218° C. (decomposition); $(\alpha)_D^{20}$: $-34.1 \pm 1°$ and $(\alpha)_{546}^{20}: -41.1°$ (c.=1; in 80% acetic acid). Chromatographically pure in tert.-butanol/acetic acid/water/pyridine (60:6:24:20); Whatman No. 1, ascending. Yield 10 g. (90% of theory).

$C_{92}H_{153}N_{24}O_{22}Br_3S + 3H_2O$ (2273.3).—Calculated (percent): C, 48.61; H, 7.05; N, 14.79; O, 17.60; Br, 10.55; S, 1.47. Found (percent) C, 48.93; H, 7.04; N, 14.76; O, 17.57; Br, 10.51; S, 1.46.

Amino acid analysis:

| | Ser | Arg | Ala | Glu | Asp | Phe | Val | Leu | Met | Thr |
|---|---|---|---|---|---|---|---|---|---|---|
| Calculated: | 1 | 2 | 1 | 2 | 2 | 1 | 1 | 1 | 1 | 1 NH$_3$ 3 |
| Found: | 0.89 | 1.95 | 1.0 | 2.02 | 2.05 | 1.0 | 1.01 | 1.02 | 0.94 | 0.96 NH$_3$ 3.15 |

(11) Nα - 2-nitrophenylsulfenyl-O-tert.-butyl-L-threonyl-O-tert.-butyl-L-seryl-L-aspastyl(β-tert.-butyl ester) - O-tert. - butyl-L-tyrosyl-O-tert.-butyl-L-seryl-ϵ-tert.-butyloxycarbonyl-L-lysyl - O - tert.-butyl-L-tyrosyl-L-leucyl-L - aspartyl(β-tert.-butyl ester)-O-tert.-butyl-L-seryl-L-arginyl(hydrobromide) - L - arginyl(hydrobromide)-L-alanyl-L-glutaminyl-L-aspartyl(β-tert. - butyl ester)-L-phenylalanyl-L-valyl - L - glutaminyl-L-tryptophyl - L-leucyl-L-methionyl-L-asparaginyl-O-tert. - butyl-L-threonine-tert.-butyl ester (7–29)

7.32 g. of H-Ser(tBu)-Arg(HBr)-Arg(HBr)-Ala-Gln-Asp(OtBu)-Phe-Val-Gln - Trp - Leu-Met-Asn-Thr(tBu)-OtBu-HBr (16–29) and 5.25 g. of NPS–Thr(tBu)-Ser(tBu)-Asp(OtBu)-Tyr(tBu) - Ser(tBu) - Lys(BOC)-Try(tBu)-Leu-Asp(OtBu)-OH (7–15) are dissolved in 150 ml. of dimethylacetamide while warming and stirring. The mixture is cooled to room temperature and is then treated dropwise with 0.42 ml. of triethylamine and subsequently with 0.52 g. of N-hydorxysuccinimide, and after cooling to $-10°$ C. is finally treated with 0.93 g. of dicyclohexylcarbodiimide, whilst stirring. The reaction mixture is kept for 60 hours at 0° C. and a further 40 hours at room temperature with magnetic stirring and is subsequently evaporated in vacuo at $10^{-2}$ mm. Hg to give a viscous paste. The solid material obtained after stirring with doubly distilled water is filtered off, suspended in a little dimethylacetamide and again precipitated with doubly distilled water. The product is carefully washed with water, suction-dried, subsequently repeatedly digested with hot ethyl acetate, filtered off and rinsed with ethyl acetate and diethyl ether. The crude product thus obtained is extracted for 18 hours with absolute tetrahydrofurane and subsequently for about 9 hours with absolute methanol in a Soxhlet in order to remove unreacted heated components (7–15). The material which has been purified in this way is filtered off using diethyl ether and is subsequently dried at 80° C. and $10^{-3}$ mm. Hg for 24 hours over $P_2O_5$: melting point= gradual decomposition from 250° C. upwards, chromatographically pure in tert.-butanol/glacial acetic acid/water/pyridine (60:6:24:20) and in amyl alcohol/pyridine/water (35:35:30). Yield 7.85 g. (68% of theory).

$C_{179}H_{387}N_{35}O_{44}BrS_2$ (3857.51).—Calculated (percent): C, 55.73; H, 7.50; N, 12.70; O, 18.25; Br, 4.14; S, 1.66. Found (percent): C, 55.64; H, 7.44; N, 12.69; O, 18.67; Br, 3.78; S, 1.67.

Amino acid analysis:

| | Thr | Ser | Asp | Tyr | Lys | Leu | Arg | Ala | Glu | Phe | Val |
|---|---|---|---|---|---|---|---|---|---|---|---|
| Calculated: | 2 | 3 | 4 | 2 | 1 | 2 | 2 | 1 | 2 | 1 | 1 |
| Found: | 1.92 | 2.73 | 4.15 | 1.95 | 0.94 | 2.03 | 1.97 | 1.0 | 2.01 | 1.04 | 1.03 |

| | Met | NH$_3$ |
|---|---|---|
| Calculated: | 1 | 3 |
| Found: | 1.02 | 3.09 |

(12) O-tert.-butyl-L-threonyl - O - tert.-butyl-L-seryl-L-aspartyl(β-tert. - butyl ester)-O-tert.-butyl-L-tyrosyl-O-tert.-butyl-L-seryl - Nϵ - tert.-butyloxycarbonyl-L-lysyl-O-tert.-butyl-L-tyrosyl-L-leucyl-L-aspartyl-(β - tert.-butyl ester)-O-tert.-butyl-L-seryl - L - arginyl(hydrobromide)-L-arginyl(hydrobromide)-L-alanyl-L-glutaminyl-L-aspartyl(β-tert.-butyl ester)-L-phenylalanyl-L-valyl-L-glutaminyl-L-tryptophyl - L - leucyl-L-methionyl-L-asparaginyl - O - tert.-butyl-L-threonine-tert.-butyl ester hydrobromide (7–29 hydrobromide)

3.85 g. of NPS-Thr(tBu)-Ser(tBu)-Asp(OtBu)-Tyr-(tBu)-Ser(tBu)-Lys(BOC)-Tyr(tBu) - Leu - Asp(OtBu)-Ser(tBu)-Arg(HBr)-Arg(HBr) - Ala - Gln - Asp(OtBu)-Phe-Val-Gln-Trp-Leu-Met-Asn-Thr(tBu) - OtBu (7–29) and 13 g. of 2-methylindole are dissolved in about 500 ml. of dimethylacetamide while stirring and the mixture is cooled to 0° C. and then treated dropwise with 100 ml. of ice-cold methanol and subsequently, while stirring and cooling with ice, with 2.2 ml. of 1 N hydrobromic acid solution in methanol, diluted with 100 ml. of methanol. After standing for 3 hours at 0° C. and 22 hours at room temperature the methanol is distilled off in vacuo at 15° C. bath temperature. Thereafter the remaining solution is stirred into 2800 ml. of absolute diethyl ether/petroleum ether (25:10). The resulting precipitate is filtered off after standing in a refrigerator for several hours and is subsequently twice reprecipitated from dimethylacetamide/diethyl ether. After drying at 80° C. and $10^{-3}$ mm. Hg over $P_2O_5$: melting point=gradual decomposition from 220° C. upwards; $(\alpha)_D^{20} = +15.27 \pm 2°$ and $(\alpha)_{546}^{20} = +17.36°$ (c.=0.6 in dimethylacetamide/phosphoric acid tris-dimethylamide (9:1)). Chromatographically pure in tert.-butanol/glacial acetic acid/water/pyridine (60:6:24:20) and amyl alcohol/pyridine/water (35:35:30). Yield 3.4 g.=88% of theory.

$C_{173}H_{285}N_{34}O_{42}Br_3S + 2H_2O$ (3821.22). — Calculated (percent): C, 54.37; H, 7.62; N, 12.58; O, 18.43; Br, 6.33; S, 0.85. Found (percent): C, 54.52; H, 7.69; N, 12.39; O, 18.65; Br, 6.28; S, 0.99.

Amino acid analysis:

| | Thr | Ser | Asp | Tyr | Lys | Leu | Arg | Ala | Glu | Phe |
|---|---|---|---|---|---|---|---|---|---|---|
| Calculated: | 2 | 3 | 4 | 2 | 1 | 2 | 2 | 1 | 2 | 1 |
| Found: | 1.86 | 2.72 | 3.94 | 1.87 | 0.98 | 2.03 | 1.95 | 1.0 | 1.94 | 1.03 |

| | Val | Met | HN$_3$ |
|---|---|---|---|
| Calculated: | 1 | 1 | 3 |
| Found: | 1.03 | 0.97 | 3.63 |

We claim:
1. A member selected from the group consisting of: a protected glucagon of the formula

N,NIm Di-adamathyloxycarbonyl-L-histidyl-O-tert.butyl-L-seryl-
1

L-glutaminyl-glycyl-O-tert.butyl-L-threonyl-L-phenylalanyl-
3        4                5                6

O-tert. butyl-L-threonyl-O-tert. butyl-L-seryl-tert. butyl-L-
7                      8 aspartyl-O-tert. butyl-L-tyrosyl-O-tert. butyl-L-seryl-tert.
9                    10                    11 butyloxycarbonyl-L-lysyl-O-tert. butyl-L-tyrosyl-L-leucyl-tert. butyl-
12                    13              14

L-aspartyl-O-tert.butyl-L-seryl-L-arginyl-L-arginyl-L-alanyl-
15              16            17          18        19

L-glutaminyl-tert.butyl-L-aspartyl-L-phenylalanyl-L-valyl-L-
20                    21                22          23 glutaminyl-L-tryptophyl-L-leucyl-L-methionyl-L-asparagaginyl-O-
24            25          26            27              28 tert.butyl-L-threonyl-O-tert. butyl;
29 and its hydrobromide salts.

(References on following page)

References Cited

UNITED STATES PATENTS

| | | | |
|---|---|---|---|
| 3,228,926 | 1/1966 | Kappeler et al. | 260—112.5 |
| 3,243,423 | 3/1966 | Beyerman | 260—112.5 |
| 3,317,559 | 5/1967 | Anderson | 260—326.3 |
| 3,325,466 | 6/1967 | Anderson et al. | 260—112.5 |
| 3,340,274 | 9/1967 | Callahan et al. | 260—326.3 |
| 3,369,041 | 2/1968 | Grezon et al. | 260—482 |

OTHER REFERENCES

Schroder: Proceedings Eighth European Peptide Symposium, September 1966, North-Holland Publishing Co., Amsterdam, pp. 245–257.

Weygand et al.: Z. Naturforschg. 21B, 1141–1144 (1966).

Wunsch: Z. Naturforschg. 22B, 1269–1276 (1967).

Wunsch et al.: Chem. Ber. 99, 110–120 (1966).

LEWIS GOTTS, Primary Examiner

M. KASSENOFF, Assistant Examiner